Oct. 17, 1944.   G. FROVA   2,360,412
FRUIT PITTING AND DESTEMMING MACHINE
Filed May 8, 1943   3 Sheets-Sheet 1

INVENTOR.

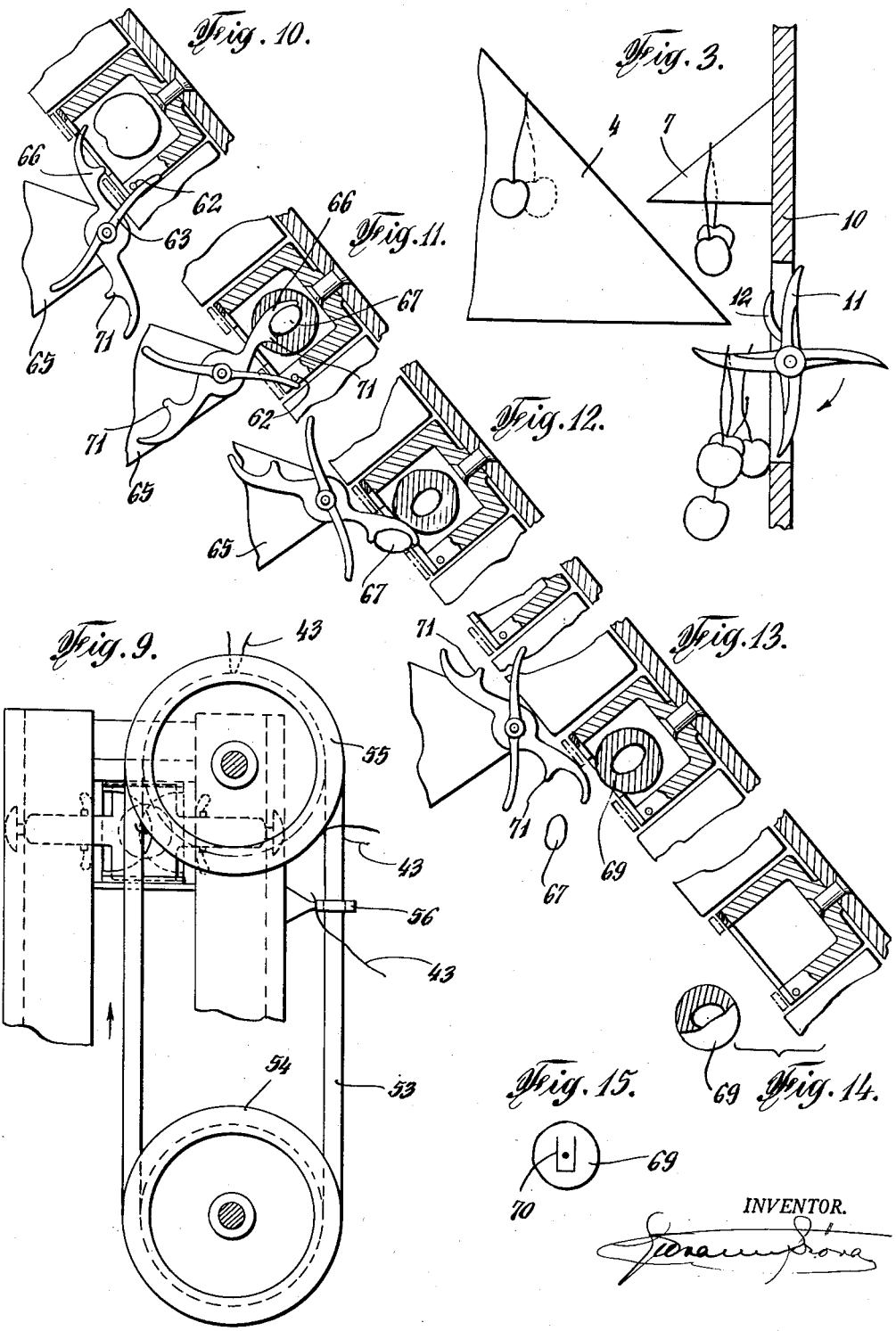

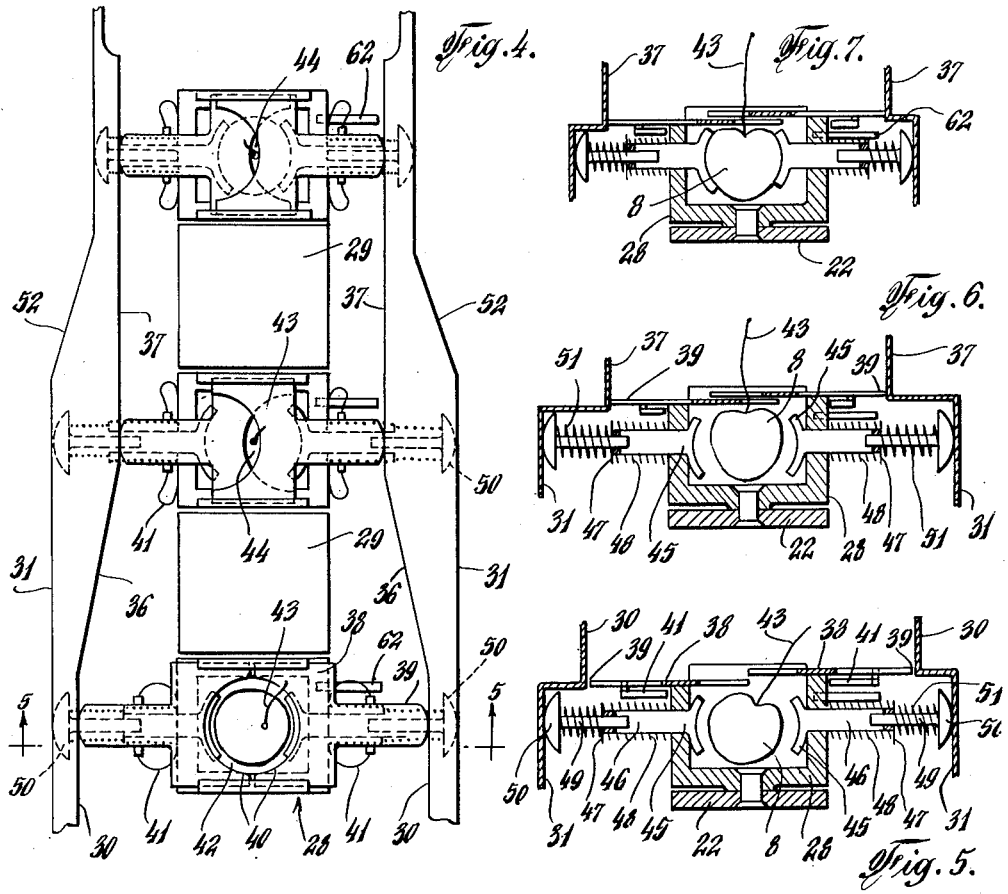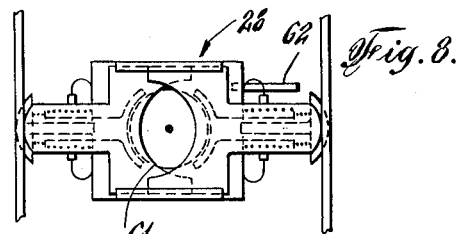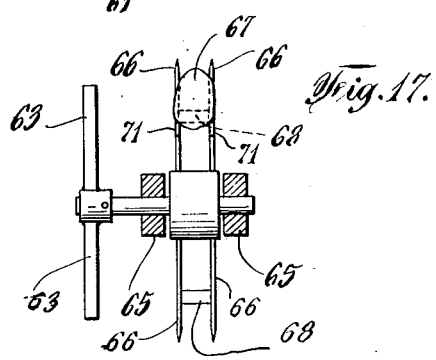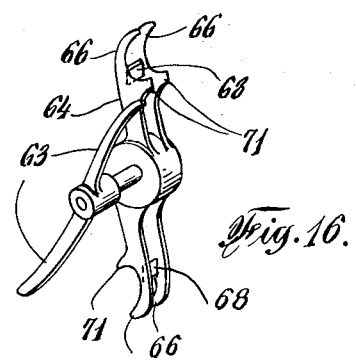

Patented Oct. 17, 1944

2,360,412

UNITED STATES PATENT OFFICE 2,360,412

FRUIT PITTING AND DESTEMMING MACHINE

Giovanni Frova, New York, N. Y.

Application May 8, 1943, Serial No. 486,166

28 Claims. (Cl. 146—18)

This invention relates to automatic apparatus for de-clustering, de-stemming and pitting fruits and berries of the kind containing pits.

The main object of my invention is to have an apparatus for de-clustering, and in accurately centered and perfect manner, de-stemming and pitting fruits and berries from the stem ends thereof.

It is also an object to have such an apparatus which is entirely automatic and self-contained for receiving berry clusters in a hopper and in a single cycle separating the stems of the clusters, centering the berries, removing the stems and pitting said berries.

Another object is to have such apparatus which is very simple in construction and operation and compact in form.

A further object is to have an apparatus as indicated which is easy to produce at a relatively low cost.

Other objects and the advantages inherent in my invention and accruing from its application in actual practice will appear in further detail as this specification proceeds.

In order to facilitate ready comprehension of the principles of the invention and the operation of the latter, the same is illustrated in the accompanying drawings forming part hereof, and in which Fig. 1 is a side elevation partly in section of a machine made according to my invention and embodying the salient features thereof in a practical form.

Fig. 3 is an enlarged fragmentary detailed portion of the same hopper of Fig. 1, partly in section.

Fig. 4 is an enlarged fragmentary plan view of part of a fruit conveyor of Figure 1.

Fig. 5 is a section of the lowest fruit conveyor unit of Fig. 4 as taken on line 5—5.

Fig. 6 is a similar sectional view of the second fruit conveyor unit of Fig. 4.

Fig. 7 is also a similar sectional view of the uppermost fruit conveyor unit in said Fig. 4.

Fig. 8 is a plan view of a fruit conveyor unit at a later stage of its travel than in the uppermost unit of Fig. 4.

Fig. 9 is a plan view of a portion of the conveyor of Fig. 1 with associated de-stemming apparatus.

Fig. 10 is a fragmentary longitudinal section of a portion of the conveyor showing one fruit conveyor unit and portions of the preceding and following spacer units, the view disclosing a pitting device in initial operative position.

Fig. 11 is a similar section of the same parts in advanced stage of operation.

Fig. 12 is also a similar section in a more advanced stage of operation.

Fig. 13 is likewise a section showing a final stage of the pitting operation.

Fig. 14 is a section showing the pitted fruit released.

Fig. 15 is a stem end view of such a pitted fruit.

Fig. 16 is a perspective view of a rotary pitter of Figs. 1 and 10 to 13.

Figure 17 is another view of the same pitter.

Throughout the views the same references indicate the same or like parts.

Figures 1, 2:
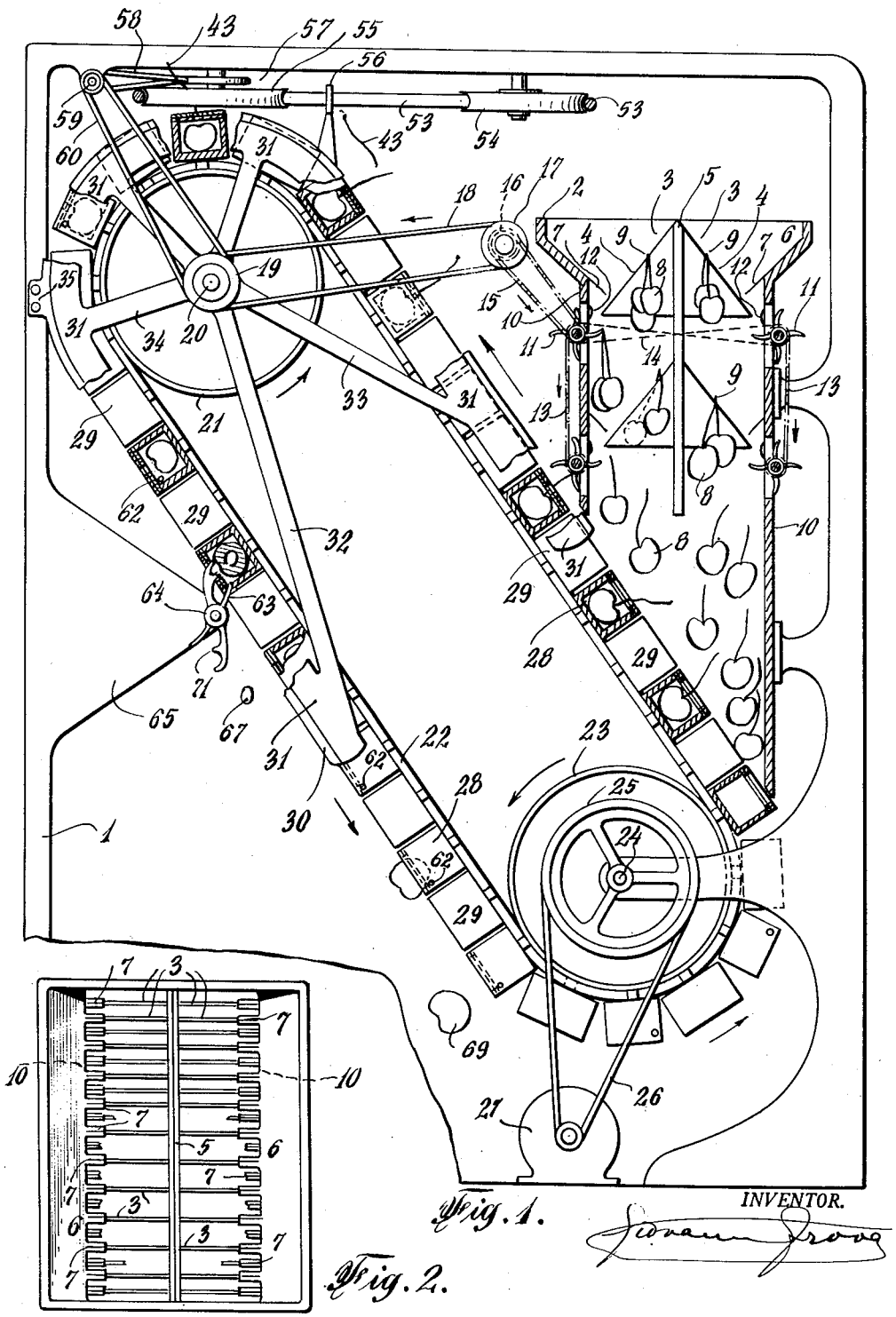
Fig. 2 is a top plan view of a fruit hopper shown at the right in Fig. 1.

In the fruit industry, much hand work is used for separating fruits or berries, such as cherries in a cluster from each other, and also for de-stemming and pitting said cherries. Moreover, more elaborate machinery has been proposed for carrying out the various functions required for presenting pitted cherries on the market, entailing considerable expense and occupying a large amount of floor space.

I now propose to greatly simplify both the apparatus for and operations of de-clustering, de-stemming and pitting cherries by a different approach to the problems involved than followed heretofore.

Hence, in the practice of my invention, a machine frame 1 forms the main support of the various parts of the apparatus, the first being a stationary vertical hopper 2, interiorly provided with partitions 3, 3 with outwardly inclined upper edges 4, 4 extending from an intermediate support 5, while the upper inclined sides 6, 6 of the hopper are provided with downwardly inclined bars or plates 7, 7 directed toward the central support in individually disposed in the same vertical planes with the mentioned partitions. The upper tiers of partitions and directing bars are alternately staggered with those of the lower tiers, so that sufficient space is available for cherries 8, 8 to drop past while their connected stems 9, 9 straddle the partitions 3, 3, and perhaps first engage the rods 7, 7 to be directed toward said partitions, so that cluster portions yet remaining associated after passing the upper partitions will be caught and separated by the lower partitions and their associated cutters.

Due to the high angle of inclination of the upper edges 4 of these partitions, the cherry clusters will gravitate down along the same toward the side walls 10, 10, where the stems will be caught by the blades of rotary cutters, 11, 11 (Figs. 1 and 3) which shear apart the stems against stationary blades 12 individually disposed in operative relation in walls 10 to the cutters, the latter being driven synchronously by belts or chains 13, 13, an interconnecting belt 14, a chain transmission 15 to a sprocket 16 rotating with a pulley 17 connected by a belt 18 to a pulley 19 fixed on the shaft 20 of a rotating drum 21, of which the operation will be explained. The mentioned drum is connected by a conveyor belt or chain 22 to a second drum 23 upon the shaft 24 of which is fixed a pulley 25 driven through a belt 26 by a motor or other prime mover 27, the conveyor as a whole being operated in an inclined upward direction beneath the hopper 2 and past the same for further operations.

In detail the conveyor belt comprises the belt proper 22 upon which are alternately fixed, by bolts or rivets, etc., a series of berry carriers 28 and space blocks 29 of substantially equal height and width, which pass between a group of side cam walls or guards 30, 30, 31, 31 during the upper portion of their circuit in their travel about the drums, said walls being supported by a plurality of arms 32, 33, 34, etc., and secured at 35 to frame 1 of the machine. As the berry carriers 28 and space blocks 29 are of the same height, the cherries 8, for example, when dropping from the partitions and cutters in the hopper, as shown in Fig. 1, will drop individually into the upwardly traveling carriers but riding unharmed over the tops of the space blocks. In any event, the cherries having just been cut apart in the hopper while suspended by their stems, will drop into the carriers with stems up, even if not accurately directed. As the carriers pass beyond the hopper, the inner cam walls 30, 30 are inclined at 36, 36 toward each other and then continue again at 37, 37 in parallelism with a predetermined shorter distance between them, for a reason which will now appear.

Upon each berry carrier 28 is mounted a pair of transversely slidable plates 38, 38, having their outer curved ends 39, 39 engaging against the side cam walls (Figs. 4–8), while their inner ends 40, 40 partly overlap and are concavely curved so as to leave an ovate slit up to a hole between them, depending on the degree of overlap of said ends. The wider part 30, 30 allows the plates 38 to extend their maximum distance outward as urged by looped leaf springs 41, 41, with the opening 42 full round and large enough to pass a cherry, as shown at the bottom of Fig. 4 and in Fig. 5. When the outer ends of these plates are forced together a limited distance by passing along inclined portions 36 of said cam walls to the narrower spacing at 37, 37, the stem 43 of the cherry 8 will be centered by the narrowing and reduction in length of the opening to a slit 44 as seen in the middle and upper portions of Fig. 4 and in Figs. 6 and 7. This centering of the stem occurs in order to erect the cherry in the position shown in Fig. 6. At the same time the two plates retain the cherries in the carriers for the de-stemming operation.

Beneath the stem centering plates on each carrier is a pair of slidably mounted grippers 45, 45 adapted to hold a cherry resiliently between the same, these grippers being provided with hollow outer ends 46, 46 terminating in flanges 47, 47 which confine springs 48, 48 between the same and the sides of the carrier involved and tending to draw out the grippers to extreme open position as in Figs. 5 and 6. A pair of plungers 49, 49 project outwardly from the hollow ends of the grippers and are provided with rounded heads 50, 50 engaging against the outer and lower cam walls 31, 31 as urged by springs 51, 51 mounted between the heads 50 and the flanges 47 of the grippers, so that when said heads encounter the inwardly inclined portions 52, 52 of said outer cam walls, the grippers will be brought resiliently together to grip the cherry as shown in Fig. 7, and thus resiliently adapt the jaws to different sizes of fruit between them. In this centered and gripped condition, each cherry is transported to the top of the conveyor at which point (Figs. 1 and 9) a belt 53 connecting a pair of pulleys 54 and 55 entangles the cherry stem 43 between the same and pulley 55 so as to pull said stem off the cherry and bring the same around to the other side of said pulley where the belt passes through a stripper ring 56 secured to the machine so as to strip off the stems from the belt. The pulley 55 is rigidly associated with another driving pulley 57 connected by a belt 58 to another pulley 59 driven in turn by a belt 60 driven by pulley 19 previously described.

When the cherries have been de-stemmed in this manner, the carriers travel down along the underside of the conveyor while the spacing between the inner upper cam walls 30 increases a little and the plates 38 open partly to present a half open aperture 61, as shown in Fig. 8, to retain the cherry in place, the grippers remaining in gripping position, holding the cherry perfectly centered and in position. In the path of a pin 62 upon each carrier is an arm 63 of a rotary pitting cutter 64 mounted on a support 65 on the frame 1, (Figs. 1 and 10–13) causing this cutter to partly rotate as the carrier with its pin travels past, so that its two cutting hooks 66, 66 and knives 71, 71 (see also Figs. 16 and 17) will penetrate the cherry and the hooks 66 engage about its pit 67 upon one side. A transverse blade 68 serves to cut a transverse slit to join with the side slits produced by hooks 66 so as to allow withdrawal of the pit by said hooks during further progress of the conveyor belt, the pit dropping out at approximately the end of the cam walls, with the cutter presenting the second hook by rotation to the next fruit. After leaving the latter, the plate and gripper ends are allowed to spring out to full extension, with the result that the de-stemmed and pitted cherry 69 drops out of the carrier as shown in Figs. 1 and 14. The cutter can be single and merely a swingable hook at one end and return to position by any means after each pitting operation.

The pit during removal merely requires the opening of a flap 70 (Fig. 15) for its removal according to the principles of this invention and as soon as the pit is extracted, the flap will tend to return to closed position, showing a minimum V-shaped cut or disfigurement of the cherry upon the stem end alone without loss of any flesh of the fruit.

It is thus seen that the apparatus is quite automatic in performing all functions in a single operation. On the other hand, certain modifications of the apparatus are possible, as for example, the outer ends of the plates and the heads of the grippers may be equipped with rollers, and any alterations or modifications within the scope of the appended claims are hereby reserved as part of the present invention.

Having now fully described my invention, I claim:

1. Apparatus for de-stemming and pitting fruit, including means in said apparatus for receiving fruits fed into the same, an endless belt conveyor having a plurality of fruit carriers traveling past a predetermined portion of the apparatus for catching the fruit individually in the carriers with stems up, means for centering the stems individually in each carrier and thereby centering the fruit, means for fixing each fruit in its carrier with the stem and thereby the whole fruit centered therein, means at one point along the path of said conveyor for seizing each fruit stem brought to said point by the conveyor and pulling the stem off the fruit while the latter is held centered in each carrier by the fixing means, means at a further point along the path of said conveyor for opening each fruit as it is brought past said further point by the conveyor and in the same stage of operation from the stem end of the fruit extracting the pit, and means at a final point along the path of said conveyor causing the fixing means and centering means to open upon each carrier as it passes said final point to release the de-stemmed and pitted fruit and allow the same to be removed from the conveyor.

2. Apparatus for de-clustering, de-stemming and pitting fruit, including a gravity fed hopper, means in said hopper for separating the stems of fruits fed into the same in clusters, an endless belt conveyor having a plurality of fruit carriers traveling upward at a rising angle past the lower portion of said hopper for individually catching the de-clustered fruit with stems up in the carriers as the fruit descends from the hopper, means effective along the rising path of said conveyor beyond said hopper for centering the stems of the fruits and thereby the fruits themselves individually in each carrier, means also effective along said rising path of the conveyor for fixing the centered fruit as centered by the centering of the stems in each carrier, means at a higher point along said path of the conveyor for seizing each fruit stem in succession as the same is brought to said higher point and pulling said stem off the fruit, cutting means at a first point upon the downward portion of the path of said conveyor for cutting into exclusively the stem end of each fruit as it is brought past said first point and extracting the pit from the fruit in a continuous operation, and means at a lower point along said downward portion of the path of said conveyor for causing each carrier as it passes said final point to release the de-stemmed and pitted fruit and allow the same to drop from the conveyor by gravity.

3. Apparatus for de-clustering, de-stemming and pitting fruit, including a gravity feed hopper, means in said hopper for separating the stems of fruits fed into the same in clusters, including a plurality of partition members with downwardly inclined upper edges terminating short of the walls of said hopper, rotary cutters mounted upon the apparatus in said walls individually opposite said partitions and driven from motive means associated with the apparatus, and stationary knives upon the walls of the hopper disposed individually adjacent to each cutter in shearing relation to the cutting edge thereof as the same are rotated past said knives, an endless belt conveyor having a plurality of fruit carriers traveling past the lower portion of said hopper for catching the fruit individually in the carriers with stems up from the hopper, means for centering the stems individually in each carrier and thereby center the fruit, means for fixing each fruit in its carrier with the stem and thereby the whole fruit centered therein, means at one point along the path of said conveyor for seizing each fruit stem brought to said point by the conveyor and pulling the stem off the fruit, means at a further point along the path of said conveyor for opening each fruit as it is brought past said further point by the conveyor and from the stem end of the fruit extracting the pit, and means at a final point along the path of said conveyor causing each carrier as it passes said final point to release the de-stemmed and pitted fruit and allow the same to drop from the conveyor by gravity.

4. Apparatus according to claim 1, wherein each fruit carrier includes a box-like carrier member open at the top and secured upon the belt of the conveyor, a pair of stem and fruit centering plates slidable over the upper opening of the carrier member having mutually overlapping concavely arcuate inner ends and outer camming ends adapted to slide against cam walls or guides spaced to determine operation of said plates, resilient means for separating said plates and pressing their outer camming ends against said cam walls to follow variations in the spacing of the same and slide said plates accordingly.

5. Apparatus according to claim 1, wherein each fruit carrier includes a box-like carrier member open at the top and secured upon the belt of the conveyor, a pair of fruit grippers slidably mounted in two opposite side walls of the carrier member having fruit gripping jaws within the latter and slidable portions extending out through said two opposite side walls and exteriorly carrying springs tending to separate said jaws, and means mounted on the outer ends of said slidable portions adapted to engage slidably against a pair of spaced cam walls or guides so as to follow variations in the spacing thereof in order to slide said gripping jaws toward or from each other in accordance with said variations.

6. Apparatus according to claim 1, wherein each fruit carrier includes a box-like carrier member open at the top and secured upon the belt of the conveyor, a pair of fruit grippers slidably mounted in two opposite side walls of the carrier member having fruit gripping jaws within the latter and slidable portions extending out through said two opposite side walls and exteriorly carrying springs tending to separate said jaws, and slidably extensible means supported upon said slidable portions and having springs urging the same outward and terminating in cam heads adapted to engage slidably against a pair of spaced cam walls or guides so as to follow variations in the spacing thereof in order to slide said gripping jaws toward or from each other in accordance with said variations, said latter springs allowing said fruit gripping jaws to engage the sides of the fruit resiliently in various adjustments according to the size of the same.

7. Apparatus according to claim 1, wherein the means for seizing and pulling off the stems of the fruit include a pair of spaced pulleys mounted on the apparatus with means for driving one of the pulleys, said one of the pulleys being located substantially tangent to the path of the stems of the fruit brought past the same by the conveyor, a belt connecting said pulleys in substantially adjacent position to a portion of said path, means for centering and guiding the stems of the fruits upon the carriers accurately into seizing engagement with the belt and said one of the pulleys to ensure the removal of said stems from the fruits, a stripper disposed adjacent to a portion of said belt to strip off adhering fruit stems during travel of said belt between said pulleys.

8. Apparatus according to claim 1, wherein the means for opening the fruit and extracting the pit include a rotatably mounted cutter having two spaced parallel cutting hooks capable of entering a fruit and hooking around a pit therein, a transverse blade between said hooks for cutting a transverse slit connecting the slits cut by said cutting hooks, and means for rotating said cutter.

9. Apparatus according to claim 1, wherein the means for opening the fruit and extracting the pit include a rotatably mounted cutter having two spaced parallel cutting hooks capable of entering a fruit and hooking around a pit therein, a transverse blade between said hooks for cutting a transverse slit connecting the slits cut by said cutting hooks, an arm rotating with said cutter, and means including a projection upon each fruit carrier of the conveyor travelling past said arm and engaging the same to rotate the cutter as each fruit is conveyed past said cutter by said conveyor.

10. Apparatus according to claim 1, wherein the means for opening the fruit and extracting the pit include a rotatably mounted cutter having at each of two symmetrically opposite ends two spaced cutting hooks capable of cutting parallel slits and entering a fruit so as to hook around a pit therein and withdraw the pit therefrom as the conveyed fruit proceeds upon the conveyor, and at each end a transverse blade between the cutting hooks thereof for cutting a transverse slit connecting the slits cut by said cutting hooks, and means for rotating said cutter.

11. Apparatus according to claim 1, wherein the means for opening the fruit and extracting the pit include a rotatably mounted cutter having at each of two symmetrically opposite ends two spaced cutting hooks capable of cutting parallel slits and entering a fruit so as to hook around a pit therein and withdraw the pit therefrom as the conveyed fruit proceeds upon the conveyor, at each end a transverse blade between the cutting hooks thereof for cutting a transverse slit connecting the slits cut by said cutting hooks, means for rotating said cutter, a pair of opposite arms rigid with said cutter so as to rotate therewith, and means including a projection upon each fruit carrier of the conveyor travelling past one of said arms and engaging the same to rotate the cutter as each fruit is conveyed past said cutter by said conveyor, said cutter rotating one-half revolution for each pitting operation preparatory to pit the next fruit.

12. Apparatus for de-clustering fruits and berries with stems connected in clusters, including a gravity feed upright hopper, a plurality of partition members with downwardly inclined upper edges terminating short of the walls of said hopper, rotary cutters mounted upon the apparatus in said walls individually opposite said partitions and driven from motive means associated with the apparatus, and stationary knives upon the walls of the hopper disposed individually adjacent to each cutter in shearing relation to the cutting edges thereof as the same are rotated past said knives.

13. Apparatus for conveying fruits and berries with stems for de-stemming and pitting operations, including a pair of spaced cam walls or guides, a belt conveyor having a series of fruit carriers mounted thereon, each fruit carrier including a box-like carrier member open at the top and secured upon the belt of the conveyor, a pair of stem centering plates slidable over the upper opening of the carrier member having mutually overlapping concavely arcuate inner ends and outer camming ends adapted to slide against said cam walls or guides which are spaced to determine operation of said plates, resilient means for separating said plates and pressing their outer camming ends against said cam walls to follow variations in the spacing of the same and slide said plates accordingly.

14. Apparatus for conveying fruits and berries with stems for de-stemming and pitting operations, including a pair of spaced cam walls or guides, a belt conveyor having a series of fruit carriers mounted thereon, each fruit carrier including a box-like carrier member open at the top and secured upon the belt of the conveyor, a pair of stem centering plates slidable over the upper opening of the carrier member having mutually overlapping concavely arcuate inner ends and outer camming ends, fruit grippers slidably mounted in two opposite side walls of the carrier member having fruit gripping jaws within the latter and slidable portions extending out through said two opposite side walls and exteriorly carrying springs tending to separate said jaws, and means mounted on the outer ends of said slidable portions adapted to engage slidably against a pair of spaced cam walls or guides so as to follow variations in the spacing thereof in order to slide said gripping jaws toward or from each other in accordance with said variations.

15. Apparatus for conveying fruits and berries with stems for de-stemming and pitting operations, including a pair of spaced cam walls or guides, a belt conveyor having a series of fruit carriers mounted thereon, each fruit carrier including a box-like carrier member open at the top and secured upon the belt of the conveyor, a pair of stem and fruit centering plates slidable over the upper opening of the carrier member having mutually overlapping concavely arcuate inner ends and outer camming ends, fruit grippers slidably mounted in two opposite side walls of the carrier member having fruit gripping jaws within the latter, and slidable portions extending out through said two opposite side walls and exteriorly carrying springs tending to separate said jaws, slidably extensible means supported upon said slidable portions and having springs urging the same outward and terminating in cam heads adapted to engage slidably against a pair of spaced cam walls or guides so as to follow variations in the spacing thereof in order to slide said gripping jaws toward or from each other in accordance with said variations, said latter springs allowing said fruit gripping jaws to engage the sides of the fruit resiliently in various adjustments according to the size of the same.

16. In apparatus for pitting fruit and berries including a conveyor for carrying the fruit through a predetermined path, the combination of means for opening the fruit and extracting the pit in one operation including a rotatably mounted cutter having two spaced parallel cutting hooks capable of entering a fruit traveling past the same on said conveyor and also hooking around a pit in said fruit and extracting said pit therefrom, and also having a transverse blade fixed between said hooks for cutting a transverse slit connecting the slits cut by said cutting hooks, and means for rotating said cutter.

17. In apparatus for pitting fruit and berries including a conveyor for carrying the fruit through a predetermined path, the combination of means for opening the fruit and extracting the pit in one stage of operation including a rotatably mounted cutter having at each of two symmetrically opposite ends two spaced cutting hooks capable of cutting parallel slits and entering a fruit so as to hook around a pit therein and withdraw the pit therefrom as the conveyed fruit proceeds upon the conveyor, and also having at each end a transverse blade fixed between the cutting hooks thereof for cutting a transverse slit connecting the slits cut by said cutting hooks, and means for rotating said cutter.

18. In apparatus for pitting fruit and berries including a conveyor for carrying the fruit through a predetermined path, the combination of means for opening the fruit and extracting the pit in one stage of operation including a rotatably mounted cutter having a cutting hook capable of entering a fruit traveling past the same on the conveyor and also hooking around the pit therein and extracting the pit from said fruit during rotary movement of said cutter, and means fixed upon said cutting hook for additionally cutting into the fruit simultaneously with the entry of the cutting hook into the same to facilitate the removal of the pit by said hook.

19. Apparatus for de-stemming fruits and berries including a conveyor means for carrying the individual fruits through a predetermined path, and means for seizing and pulling off the stems of the fruit including a pair of spaced pulleys mounted on the apparatus with means for driving one of the pulleys, said one of the pulleys being located substantially tangent to the path of the stems of the fruit brought past the same by the conveyor means, a belt connecting said pulleys in substantially adjacent position to a portion of said path, and means for centering and guiding the stems of the fruits on the conveyor means accurately into effective seizing engagement with said one of the pulleys and said belt.

20. Apparatus for de-clustering fruits with stems connected in clusters, including a gravity fed hopper, means in said hopper for separating the stems of the fruits fed into the same in clusters, comprising a plurality of partition members with downwardly inclined upper edges terminating short of the walls of said hopper, rotary cutters mounted upon the apparatus in said walls individually opposite said partitions and driven from motive means associated with the apparatus, and stationary knives upon the walls of the hopper disposed individually adjacent to each cutter in shearing relation to the cutting edge thereof as the same are rotated past said knives.

21. Apparatus for de-stemming fruits with stems fed to the apparatus, including a carrier conveyor, and means for seizing and pulling off the stems of the fruit comprising a pair of spaced pulleys mounted on the apparatus with means for driving one of the pulleys, said one of the pulleys being located substantially tangent to the path of the stems of the fruit brought past the same by the conveyor, a belt connecting said pulleys in substantially adjacent position to a portion of said path, and means upon each carrier for centering and guiding the stem of the respective fruit thereon into accurate perpendicular position with respect to the path of travel of the carrier and thereby into effective seizing engagement with the belt and said one of the pulleys to remove said stem from said fruit.

22. Apparatus for pitting fruits such as cherries and the like, including means for conveying the fruits individually past a pitting zone on the apparatus, and means for opening the fruit and extracting the pit from each fruit, including a rotatably mounted cutter having two spaced parallel cutting hooks capable of entering a fruit and hooking around a pit therein, a transverse blade fixed between said hooks for cutting a transverse slit connecting the slits cut by said cutting hooks, and means for rotating said cutter.

23. Apparatus for pitting fruits such as cherries and the like, including means for conveying the fruits individually past a pitting zone on the apparatus, and means for opening the fruit and extracting the pit from each fruit, including a rotatably mounted cutter having two spaced parallel cutting hooks capable of entering a fruit and hooking around a pit therein, a transverse blade rigidly secured between said hooks for cutting a transverse slit connecting the slits cut by said cutting hooks, an arm rotating with said cutter, and means including a projection upon each fruit carrier of the conveyor traveling past said arm and engaging the same to rotate the cutter as each fruit is conveyed past said cutter by said conveyor.

24. Apparatus for pitting fruits such as cherries and the like, including means for conveying the fruits individually past a pitting zone of the apparatus, and means for opening the fruit and extracting the pit from each fruit, including a rotatably mounted cutter having at each of two symmetrically opposite ends two spaced cutting hooks capable of cutting parallel slits and entering a fruit so as to hook around a pit therein and withdraw the pit therefrom as the conveyed fruit proceeds upon the conveyor, and at each end a transverse blade fixed between the cutting hooks thereof for cutting a transverse slit connecting the slits cut by said cutting hooks, and means for rotating said cutter.

25. Apparatus for de-stemming fruits and berries, including means for carrying the individual fruits through a predetermined path, and means for seizing and pulling off the stems of the fruits, including a pair of spaced pulleys mounted on the apparatus with means for driving one of the pulleys, said one of the pulleys being located substantially tangent to the path of the stems of the fruit brought past the same by the carrying means, a belt connecting said pulleys in substantially adjacent position to a portion of said path, means for centering and guiding the stems of the fruits in the carrying means accurately into effective seizing engagement with said one of the pulleys and said belt.

26. Apparatus according to claim 25 having a stripper disposed adjacent to a portion of the belt to strip off adhering fruit stems during travel of said belt between said pulleys.

27. Apparatus for conveying fruits with stems and pits preparatory to de-stemming and/or pitting the same, including conveying means having a plurality of regularly spaced fruit receiving means, centering means upon each fruit receiving means for centering the stem of a fruit therein perpenudicularly to the path of travel of the receiving means, distinct gripping means associated with each fruit receiving means for gripping the fruit therein when the same has been centered in said means by the centering of the stem thereof, and camming means engaging with portions upon said centering means and with portions upon said gripping means to operate the centering and gripping means upon movement of said conveying means.

28. Apparatus for conveying fruits with stems preparatory to de-stemming the same, including conveying means having a plurality of regularly spaced fruit receiving means, centering means upon each fruit receiving means for centering the stem of a fruit therein perpendicularly to the path of travel of the receiving means, and camming means engaging with a portion upon said centering means to operate the centering means upon movement of said conveying means.

GIOVANNI FROVA.